United States Patent
Chen et al.

(10) Patent No.: US 11,733,127 B2
(45) Date of Patent: Aug. 22, 2023

(54) POWER ASSEMBLY FOR ROBOTIC PLATFORM FOR GLOBAL VEHICLE TARGET (GVT) OF AUTONOMOUS DRIVING

(71) Applicant: TONGJI UNIVERSITY, Shanghai (CN)

(72) Inventors: Hong Chen, Shanghai (CN); Zhihua Li, Shanghai (CN); Lin Zhang, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 42 days.

(21) Appl. No.: 17/529,281

(22) Filed: Nov. 18, 2021

(65) Prior Publication Data
US 2022/0155182 A1 May 19, 2022

(30) Foreign Application Priority Data
Nov. 18, 2020 (CN) .......................... 202011294752.5

(51) Int. Cl.
*G01M 17/06* (2006.01)
(52) U.S. Cl.
CPC .................................. *G01M 17/06* (2013.01)
(58) Field of Classification Search
CPC ............. G01M 17/06; G01M 17/0074; G01M 17/007; G01M 17/0078; G01M 7/08; B60K 2006/4825; B25J 5/007; B25J 5/00; B60L 2200/36; G09B 9/048; G08G 1/16
See application file for complete search history.

(56) References Cited

U.S. PATENT DOCUMENTS

| | | | |
|---|---|---|---|
| 2008/0282494 A1* | 11/2008 | Won | G05D 1/0227 15/412 |
| 2020/0370998 A1* | 11/2020 | Amacker | G01M 17/007 |
| 2021/0046913 A1* | 2/2021 | Wirthl | B60T 8/1761 |

FOREIGN PATENT DOCUMENTS

| | | | |
|---|---|---|---|
| CN | 109187041 | 1/2019 | |
| CN | 111257014 | 6/2020 | |
| WO | WO-0115967 A1 * | 3/2001 | ............. B62K 3/002 |

OTHER PUBLICATIONS

Ogura Industrial, Youtube, Spring Applied Brake Installation, 2017, https://www.youtube.com/watch?v=D2Vχ-I-cr64 (Year: 2017).*

(Continued)

*Primary Examiner* — Eric S. McCall
*Assistant Examiner* — Timothy P Graves
(74) *Attorney, Agent, or Firm* — JCIP Global Inc.

(57) ABSTRACT

The present invention relates to a power assembly for a robotic platform for a Global Vehicle Target (GVT) of autonomous driving. The power assembly includes an assembly housing, a motor, a transmission mechanism, a standby brake, a suspension and wheels, where when the power assembly is in use, a driving force output by the motor is transmitted to the wheels by means of the transmission mechanism, so as to drive the wheels to rotate, the standby brake is used for braking an output shaft of the motor, a top of the suspension supports the assembly housing, and when a load borne by the assembly housing changes, the suspension contracts or extends to drive the wheels to rotate upwards and downwards with a housing of the transmission mechanism as a swing arm and a rotating shaft of the motor as a swing arm rotation center.

9 Claims, 11 Drawing Sheets

(56) References Cited

OTHER PUBLICATIONS

KEB America, Youtube Spring Applied Brakes—Failsafe Braking, 2014, https://www.youtube.com/watch?v=SoYIjul2Lw (Year: 2014).*
IRobot Education, Yourtube, Take Apart a Robot: Roomba i7 Robot Vacuum, 2020) discloses awheel module and bottom cover protect electronics. (Year: 2020).*

* cited by examiner

POWER ASSEMBLY FOR ROBOTIC PLATFORM FOR GLOBAL VEHICLE TARGET (GVT) OF AUTONOMOUS DRIVING

CROSS-REFERENCE TO RELATED APPLICATION

This application claims the priority benefit of China application no. 202011294752.5, filed on Nov. 18, 2020. The entirety of the above-mentioned patent application is hereby incorporated by reference herein and made a part of this specification.

BACKGROUND

Technical Field

The present invention relates to the field of autonomous driving, and in particular to a power assembly for a robotic platform for a Global Vehicle Target (GVT) of autonomous driving.

Description of Related Art

Vehicle collision test of autonomous driving is generally used for detecting the perceived capability of the subject vehicle to the surrounding environment, the capability to deal with emergencies, and the capability of cooperative interaction between vehicles. In order to ensure the safety of the test operator and instrument in the collision test, the Global Vehicle Target (GVT) is made of flexible materials such as foam materials or fabric, and has the capability of moving autonomously and simulating high-speed movement of the vehicle in the real road environment. In the collision test of autonomous driving, the target vehicle is impacted and rolled over by the subject vehicle at high speed when being running at high speed, it must be ensured that the subject vehicle will not be damaged or rolled over during collision and rolling, and accordingly, the general height of the robotic platform is not greater than 100 mm. In addition, the power assembly generates much heat and is difficult in heat dissipation under working conditions such as high temperature and high speed. The above severe test conditions put forward the requirements for the robotic platform for the GVT of autonomous driving, such as high power density, ultra-thin structure, high structural strength and active heat dissipation.

At present, the height of the robotic platform for the domestic target vehicle used in the test is too large to complete dangerous test conditions such as high speed and collision. "Unmanned subject vehicle platform and method for a test field of autonomous driving" with publication No. CN 109187041A is taken as an example. The platform has large height and many hard surface structures, which is not suitable for verification test under dangerous conditions such as high-speed collision and rolling. "Power assembly for a traffic simulator bearing platform for an unmanned test" with application publication No. CN 111257014A is taken as another example. The solution uses a dual motor structure to meet the requirements of system power and compactness. However, due to rigid coupling of output shafts of two motors, it is difficult to achieve coordinated synchronization of motor output, resulting in high transmission heat and low efficiency; and the motor lacks the heat dissipation device, such that continuous working capability is poor.

SUMMARY

The objective of the present invention is to provide a power assembly for a robotic platform for a Global Vehicle Target (GVT) of autonomous driving in order to overcome the above defects existing in the prior art, which may be achieved by means of the following technical solution:

a power assembly for a robotic platform for a GVT of autonomous driving includes an assembly housing, a motor, a transmission mechanism, a standby brake, a suspension and wheels, where an apparatus moving groove is provided at a bottom of the assembly housing, the transmission mechanism, the standby brake, the suspension and the wheels are arranged inside the apparatus moving groove, the motor is fixedly arranged inside the assembly housing, an output shaft of the motor is in transmission connection with an input end of the transmission mechanism, the standby brake is fixedly connected to the assembly housing, the standby brake is connected to the output shaft of the motor, rotating shafts of the wheels are in transmission connection with an output end of the transmission mechanism, the suspension is fixedly arranged at the end of the transmission mechanism away from the motor, the suspension is fixedly arranged, and a top of the suspension abuts against a groove top of the apparatus moving groove; and when the power assembly is in use, a driving force output by the motor is transmitted to the wheels by means of the transmission mechanism, so as to drive the wheels to rotate, the standby brake is used for braking the output shaft of the motor, a top of the suspension supports the assembly housing, and when a load borne by the assembly housing changes, the suspension contracts or extends to drive the wheels to rotate upwards and downwards with a housing of the transmission mechanism as a swing arm and a rotating shaft of the motor as a swing arm rotation center.

Preferably, the assembly housing includes a main housing and a motor bottom cover, where an upper motor groove is provided at a bottom of the main housing, a lower motor groove is provided on the motor bottom cover, the motor bottom cover covers the bottom of the main housing, and the upper motor groove matches the lower motor groove to form a motor cavity for fixedly arranging the motor.

Preferably, an upper water jacket is arranged on the main housing and is arranged close to the upper motor groove, a lower water jacket is arranged on the motor bottom cover and is arranged close to the lower motor groove, a top of the upper water jacket is in communication with the outside, a bottom of the lower water jacket is in communication with a top of the lower water jacket, the bottom of the lower water jacket is in communication with the outside, a liquid for cooling the motor is accommodated in the upper water jacket and the lower water jacket, and the power assembly further includes water changing members arranged inside the upper water jacket and the lower water jacket, where the water changing members are used for adding or discharging the liquid in the upper water jacket and the lower water jacket.

Preferably, an upper water cavity is provided at a top of the main housing and is provided close to the upper motor groove, an upper water jacket cover is fixedly arranged at a top of the upper water cavity, the upper water jacket is formed between the upper water jacket cover and the upper water cavity, a water injection hole is provided on the upper water jacket cover, a first water passing hole is provided at a bottom of the upper water cavity, a lower water cavity is provided at a bottom of the motor bottom cover and is provided close to the lower motor groove, a lower water jacket cover is fixedly arranged at a bottom of the lower water cavity, the lower water jacket is formed between the lower water jacket cover and the lower water cavity, a second water passing hole is provided at a top of the lower water cavity, a discharge hole is provided at a bottom of the lower water jacket cover, and the upper water cavity is in communication with the lower water cavity by means of the first water passing hole and the second water passing hole.

Preferably, the water changing members each include a discharge button, a return spring, a communicating pipe and a discharge seat, where the communicating pipe is arranged in the first water passing hole and the second water passing hole in a penetrating manner, the discharge seat is a hollow cylinder, the discharge seat is fixedly arranged on the discharge hole, a discharge opening is provided on a peripheral side of a bottom of the discharge seat, a top of the discharge button is arranged at the water injection hole, a middle of the discharge button is arranged inside the communicating pipe in a penetrating manner, a peripheral side of the discharge button and the communicating pipe are arranged in a spaced manner to form a water discharging channel, a bottom of the discharge button is arranged in the discharge seat in a penetrating manner, the discharge button is a cylinder, a hollow water inlet cavity is provided at an upper portion of the discharge button, a top of the hollow water inlet cavity is in communication with the outside by means of the water injection hole, a water inlet opening is provided on a peripheral side of the hollow water inlet cavity, the hollow water inlet cavity is in communication with the upper water cavity by means of the water inlet opening, a first limiting table is arranged on a peripheral side of a top end of the discharge button, a top surface of the first limiting table abuts against a bottom of the water inlet opening, a top end of the return spring abuts against a bottom surface of the first limiting table, a bottom end of the return spring abuts against a top of the communicating pipe, a hollow water outlet cavity is provided at a bottom of the discharge button, the hollow water outlet cavity is in communication with the outside by means of the discharge hole, a water outlet opening is provided on a peripheral side of the hollow water outlet cavity, and a second limiting table is arranged on a peripheral side of a lower portion of the discharge button;

when the liquid is added into the upper water jacket and the lower water jacket, the liquid enters the upper water jacket through the water injection hole, the hollow water inlet cavity and the water inlet opening in sequence, the liquid in the upper water jacket enters the lower water jacket by means of the water discharging channel, and the water outlet opening is away from the discharge opening; and when the liquid in the upper water jacket and the lower water jacket is discharged, the discharge button moves downwards until the second limiting table abuts against a top of the discharge seat, the water outlet opening is in communication with the discharge opening, the liquid in the upper water jacket enters the lower water jacket by means of the water discharging channel, and the liquid in the lower water jacket flows out of the lower water jacket through the discharge opening, the water outlet opening, the hollow water outlet cavity and the discharge hole in sequence.

Preferably, temperature sensors are arranged inside the upper water jacket and the lower water jacket respectively.

Preferably, a top of the assembly housing is provided with a wheel retraction window, and when the suspension contracts to drive the wheels to rotate upwards, tops of the wheels pass through the wheel retraction window.

Preferably, two sealing rings are arranged inside the discharge seat, the sealing rings are arranged above the discharge opening at an interval, and when the liquid is added into the upper water jacket and the lower water jacket, the water outlet opening is located between the two sealing rings above the discharge opening.

Preferably, three sealing rings are arranged inside the discharge seat, where two sealing rings are arranged above the discharge opening at an interval, and when the liquid is added into the upper water jacket and the lower water jacket, the water outlet opening is located between the two sealing rings above the discharge opening, and the other sealing ring is located below the discharge opening.

Preferably, a plurality of sealing rings are fixedly arranged on an outer side wall of the communicating pipe.

Preferably, the suspension is one of an air bag suspension and a spiral spring suspension.

Preferably, the power assembly further includes an assembly controller and a motor driver and a brake driver that are respectively connected to the assembly controller, where the motor driver is connected to the motor, and the brake driver is connected to the standby brake.

Preferably, the standby brake is one of a hydraulic disc brake and an electromagnetic brake.

Preferably, the motor is a permanent magnet alternating current motor.

Preferably, the transmission mechanism transmits a motor driving/braking force to the wheels by means of mechanisms of a multi-stage gear, a planetary gear-synchronous chain or a planetary gear-synchronous belt, etc., thereby having effects of reducing speed and increasing torque.

Compared with the prior art, the present invention has the following advantages:

(1) the present invention uses the motor, the transmission mechanism, the suspension and the wheels to achieve connection and movement forms of upward and downward rotation of the wheels with the housing of the transmission mechanism as the swing arm and the rotating shaft of the motor as the swing arm rotation center, during extreme working conditions of high-speed collision, rolling, etc., a subject vehicle rolls over a robotic platform, the suspension is compressed, the wheels retract the power assembly housing, and the housing is stressed as a whole, thereby avoiding structural overload damage caused by single point stress, and effectively improving structural reliability of the robotic platform, and a rotation manner of the wheels may simplify an internal structure of the power assembly, thereby reducing a size of the power assembly, and avoiding tripped rollover during rolling of the subject vehicle;

(2) the driving force output by the motor of the present invention is transmitted to the wheels by means of the transmission mechanism, thereby reducing the speed and increasing the torque, and improving reliability and stability of the power assembly;

(3) in order to facilitate mounting of the motor, the assembly housing includes the main housing and the motor bottom cover to form the motor cavity for arranging the motor, and a non-screw mounting mode may be used for mounting the motor to achieve a extremely low structure height;

(4) corresponding to a structure of the assembly housing, the upper water jacket and the lower water jacket are arranged inside the assembly housing of the present invention, and under a high temperature condition, cold water may be injected into the upper water sleeve and the lower water jacket to speed up heat dissipation of the motor, such that a system works within a safe temperature range, and when a water temperature is too high, the discharge button may be pressed down to release hot water, and cold water is re-injected to ensure continuous working of the system under high temperature and large load working conditions;

(5) a set of standby brake is mounted at a tail end of the output shaft of the motor of the present invention to provide the braking force for the power assembly in an emergency of motor failure, and this double redundant braking system will greatly improve failure function safety of the robotic platform;

(6) the water changing members of the present invention structurally match the upper water jacket and the lower water jacket, such that the liquid in the upper water sleeve and the lower water jacket may be quickly and efficiently discharged, and the liquid is added into the upper water sleeve and the lower water jacket, so as to improve heat dissipation effect and efficiency; and (7) the sealing rings are arranged on the peripheral side of the communicating pipe and inside the discharge seat, thereby effectively improving sealing performance of the upper water jacket and the lower water jacket, and preventing a condition that water in the upper water jacket and the lower water jacket flows out during use, thereby affecting the heat dissipation effect.

In the figures, 1. motor, 2. transmission mechanism, 3. standby brake, 4. suspension, 5. water injection hole, 6. wheel, 7. main housing, 8. motor bottom cover, 9. upper water jacket cover, 10. lower water jacket cover, 11. discharge hole, 12. upper water cavity, 13. first water passing hole, 14. lower motor groove, 15. second water passing hole, 16. lower water cavity, 17. upper motor groove, 18. return spring, 19. discharge button, 20. discharge seat, 21. communicating pipe, 22. sealing ring, 23. water outlet opening, 24. second limiting table, 25. discharge opening, 26. water inlet opening, 27. first limiting table, and 28. wheel retraction window.

DESCRIPTION OF THE EMBODIMENTS

The present invention is described in detail below with reference to the accompanying drawings and specific embodiments. It is noted that the description of the following implementations are only substantive examples, the present invention is not intended to limit applicability or use of the implementation, and the present invention is not limited to the following implementations.

Embodiment

A power assembly for a robotic platform for a Global Vehicle Target (GVT) of autonomous driving includes an assembly housing, a motor 1, a transmission mechanism 2, a standby brake 3, a suspension 4 and wheels 6.

Figure 1:
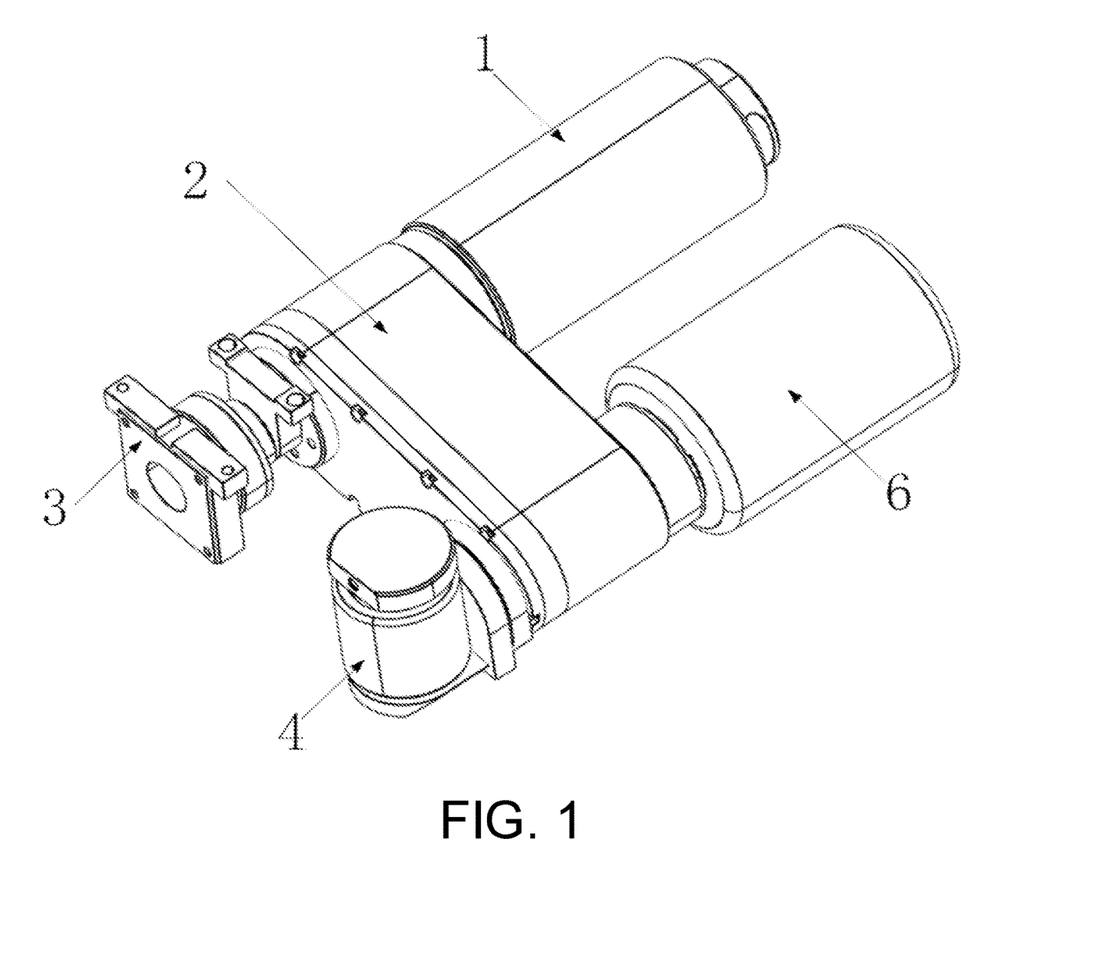
FIG. 1 is a structural schematic diagram of an apparatus inside an assembly housing of the present invention.
Figure 2:
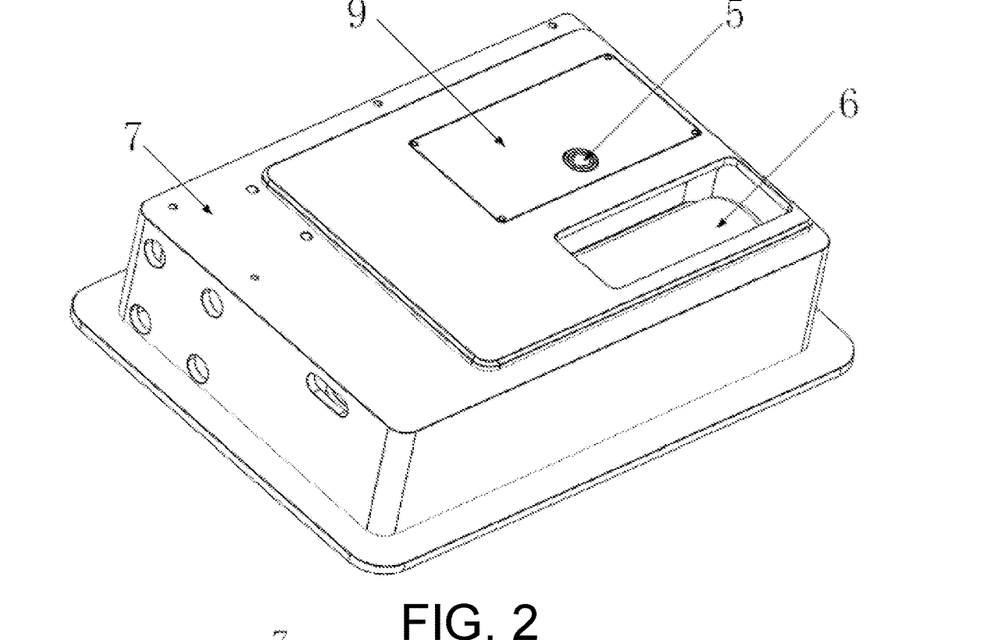
FIG. 2 is a schematic diagram of a top surface structure of the present invention.
Figure 3:
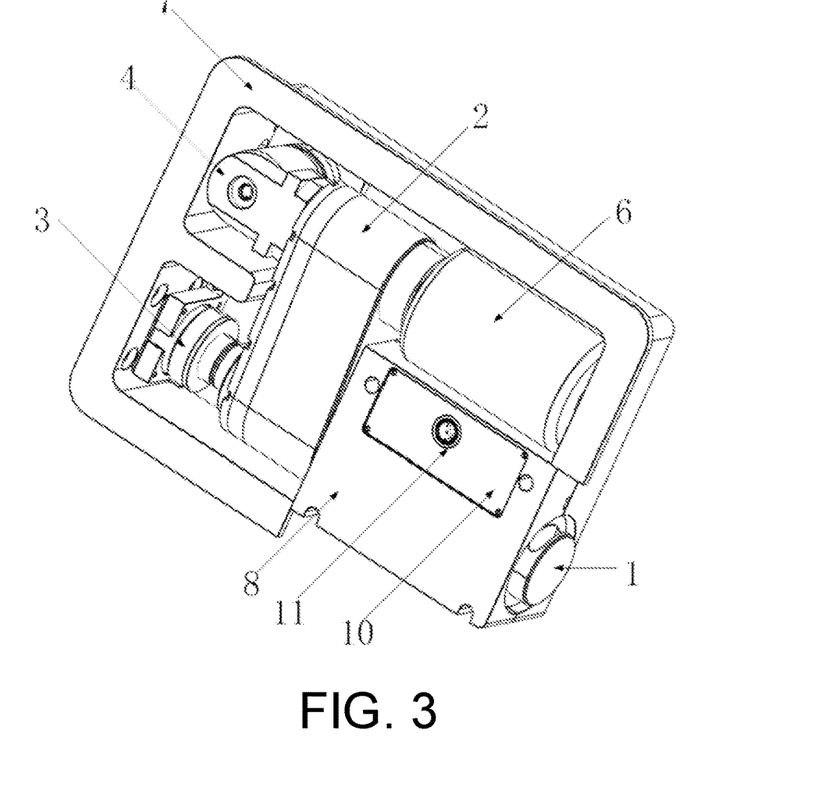
FIG. 3 is a schematic diagram of a bottom surface structure of the present invention.

Mounting, connection and fixation of devices inside the assembly housing are as shown in FIGS. 1-3. An apparatus moving groove is provided at a bottom of the assembly housing, the transmission mechanism 2, the standby brake 3, the suspension 4 and the wheels 6 are arranged inside the apparatus moving groove, the motor 1 is fixedly arranged inside the assembly housing, an output shaft of the motor 1 is in transmission connection with an input end of the transmission mechanism 2, the standby brake 3 is fixedly connected to the assembly housing, the standby brake 3 is connected to the output shaft of the motor 1, rotating shafts of the wheels 6 are in transmission connection with an output end of the transmission mechanism 2, the suspension 4 is fixedly arranged at the end of the transmission mechanism 2 away from the motor 1, the suspension 4 is fixedly arranged, and a top of the suspension 4 abuts against a groove top of the apparatus moving groove.

In one implementation of the present invention, the motor 1 uses a high-speed permanent magnet alternating current motor, and this type of motor 1 has the advantages of high speed, large output power, small diameter, etc., and achieves an extremely low structure height by means of a non-screw mounting manner.

Figure 10:
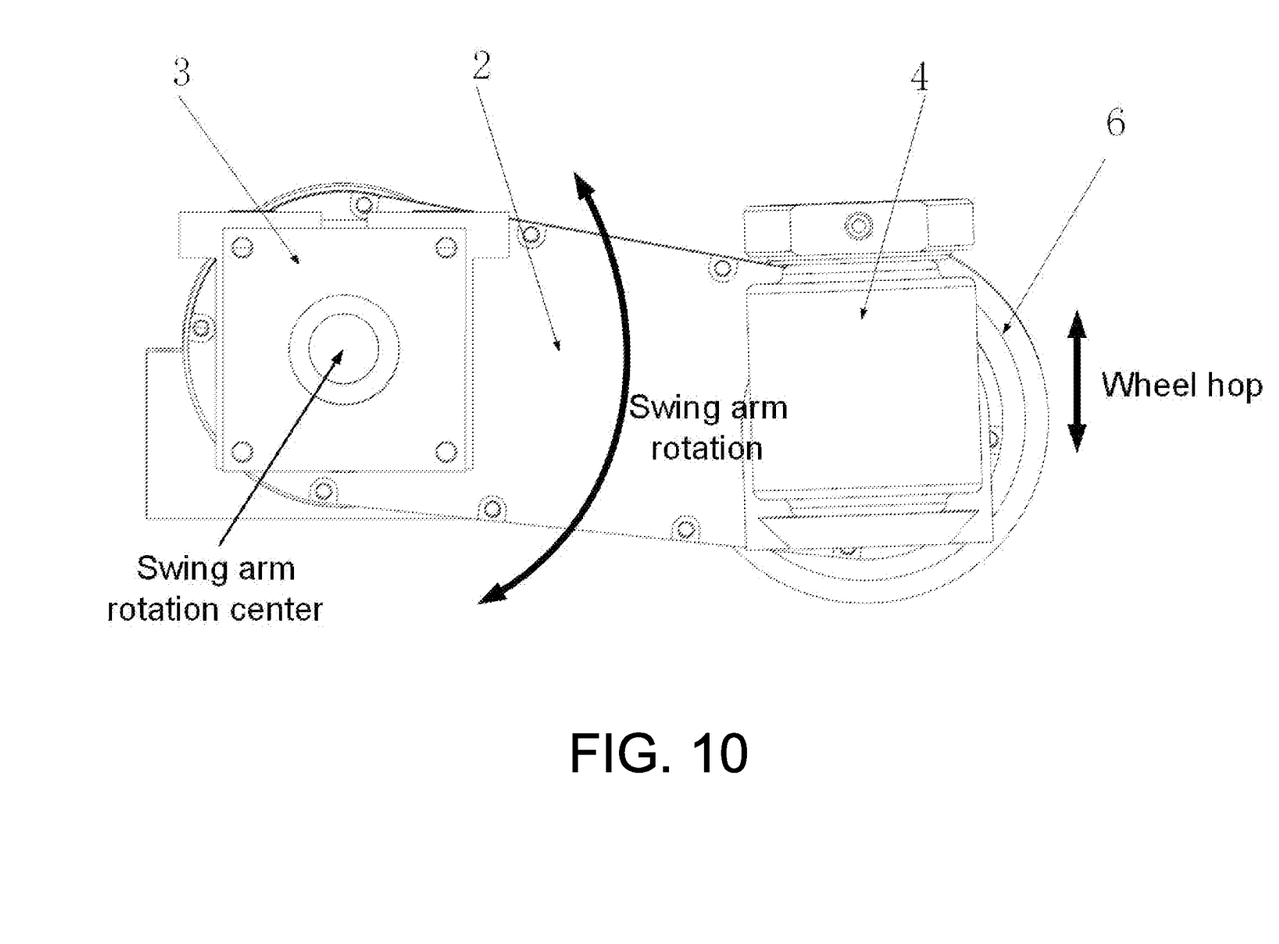
FIG. 10 is a schematic diagram of a movement principle of the present invention.
Figure 11:
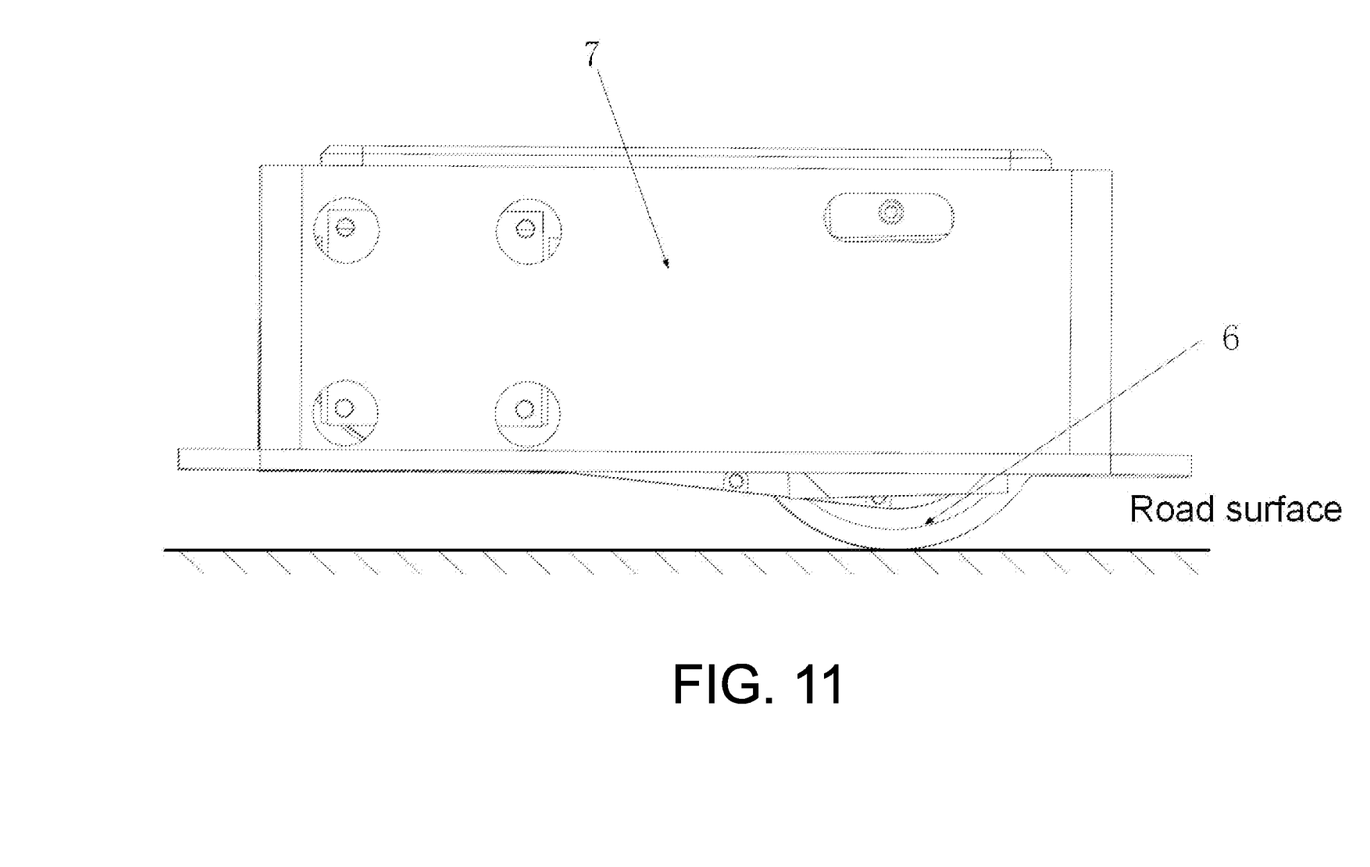
FIG. 11 is a structural schematic diagram of the present invention during normal use on a road surface.
Figure 12:
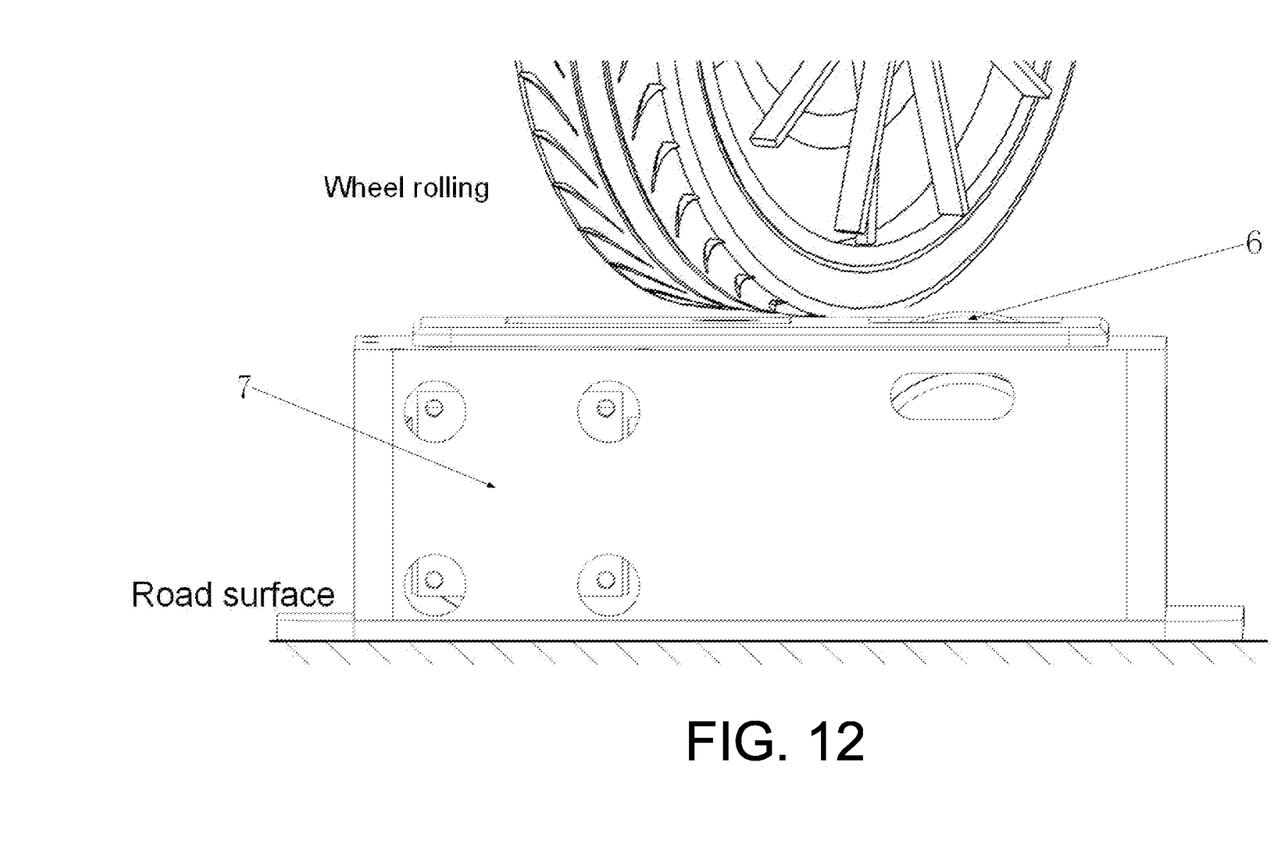
FIG. 12 is a structural schematic diagram of the present invention during rolling by wheels.

On the basis of this structure, as shown in FIGS. 10-12, when the power assembly is in use, a driving force output by the motor 1 is transmitted to the wheels 6 by means of the transmission mechanism 2, so as to drive the wheels 6 to rotate, the standby brake 3 is used for braking an output shaft of the motor 1, a top of the suspension 4 supports the assembly housing, and when a load borne by the assembly housing changes, the suspension 4 contracts or extends to drive the wheels 6 to rotate upwards and downwards with a housing of the transmission mechanism 2 as a swing arm and a rotating shaft of the motor 1 as a swing arm rotation center.

The assembly housing of the present invention is integrally formed by using aluminum alloy, thereby achieving light weight of the structure on the premise of ensuring structural strength. A reinforcing column and a rib plate are additionally arranged in a cavity inside the assembly housing, and a height of a side wall of the housing is designed by means of an equipotential body optimization design method, thereby achieving light weight on the premise of ensuring strength. When the assembly housing is rolled over by a vehicle, stress is uniformly transmitted to the side wall of the assembly housing, a stress equipotential body is formed, thereby avoiding stress concentration, and the assembly housing does not generate plastic deformation.

In one implementation of the present invention, the present invention uses the high-power high-speed permanent magnet alternating current motor 1 as a power source and matches the transmission mechanism 2 with a high transmission ratio, thereby meeting power and torque requirements of a system, and this type of motor 1 has the advantages of high rotating speed, high output power, small diameter, etc., and achieves the extremely low structure height by means of the non-screw mounting manner.

Further, the transmission mechanism 2 may use a planetary gear mechanism-synchronous belt/chain combined transmission solution, the output shaft of the motor 1 firstly transmits power to a planetary gear mechanism to reduce speed and increase torque, and then the power is transmitted to the wheels 6 by means of a synchronous belt/chain; and a length of a longitudinal single swing arm of the suspension may be changed by changing a length of the synchronous belt/chain, thereby matching motors 1 and wheels 6 of different sizes. The transmission mechanism 2 may use another solution using a multi-stage gear, and the stage number of the multi-stage gear and the matched gear tooth number and module are changed, such that different transmission ratios and different lengths of the longitudinal single swing arm of the suspension may be achieved; and the solution increases parameter configuration flexibility of the power system, and meanwhile ensures that a height of the structure may not be increased along with a change of parameter matching.

In the present invention, the standby brake 3 is one of a hydraulic disc brake and an electromagnetic brake. When the standby brake 3 is the electromagnetic brake, a tail end of the output shaft of the motor 1 is connected to the electromagnetic brake, and the electromagnetic brake may be attracted to generate a braking force after the motor is energized. When the standby brake 3 is the hydraulic disc brake, the disc brake is additionally arranged at the tail end of the output shaft of the motor 1, and moreover, an additional hydraulic source and a corresponding controller are additionally arranged, such that a high-pressure oil source is provided for the standby brake 3, thereby achieving quick braking in an emergency.

The suspension 4 is mounted at a rear end of the transmission mechanism 2, and is mounted opposite the wheels 6, thereby having effects of supporting a robotic platform, buffering impact of a road surface, etc., the power assembly of the present invention rotates with the housing of the transmission mechanism as the longitudinal single swing arm of the suspension and the rotating shaft of the motor 1 as the swing arm rotation center, the suspension 4 is vertically mounted among a tail end of the assembly housing, the assembly housing and a bracket fixedly connected to the tail end of the transmission mechanism 2.

Specifically, in the present invention, the suspension 4 is one of an air bag suspension and a spiral spring suspension. When the suspension 4 is the air bag suspension, an air bag is inflated to support the wheels 6, and inflation pressure of the air bag is changed, such that rigidity of the suspension may be adjusted, the robotic platform may maintain a certain ground clearance under different loads, when the wheels 6 pass through an uneven road surface, the suspension isolates vibration and impact of the road surface, and when testing is carried out on the road surface with a surface evenness difference, inflation pressure of the air bag suspension is properly increased, such that ground clearance may be increased, thereby improving passing ability of the robotic platform; and when the suspension is the spiral spring suspension, the spiral spring suspension has the same effect as the air bag suspension, and the subject vehicle rolls onto the robotic platform to compress the spiral spring suspension, such that the assembly housing bears pressure.

In order to further reduce a height and size of the present invention and improve practicability and a use effect, a top of the assembly housing is provided with a wheel retraction window 28, and when the suspension 4 contracts to drive the wheels 6 to rotate upwards, tops of the wheels 6 pass through the wheel retraction window 28.

When the present invention is in use, the power assembly bears the robotic platform, and during normal operation, the suspension 4 supports the wheels 6 to ensure ground clearance and passing ability of the power assembly; in a case of collision, the subject vehicle of autonomous driving rolls over the robotic platform to compress the suspension 4, and the wheels 6 retract the assembly housing, the vehicle load and impact are borne by the assembly housing and finally transmitted to the ground, and an equipotential structure of the assembly housing avoids plastic deformation and damage caused by structural overload or stress concentration; and after the subject vehicle passes through the robotic platform, the suspension 4 re-supports the wheels 6, and the robotic platform returns to normal operation.

In order to carry out heat dissipation and cooling on an apparatus and the motor 1, so as to meet continuous test requirements under extreme working conditions of summer high temperature, continuous high speed, etc., as shown in FIGS. 4-9, an upper water jacket is arranged on a main housing 7 and is arranged close to an upper motor groove 17, a lower water jacket is arranged on a motor bottom cover 8 and is arranged close to a lower motor groove 14, a top of the upper water jacket is in communication with the outside, a bottom of the lower water jacket is in communication with a top of the lower water jacket, the bottom of the lower water jacket is in communication with the outside, a liquid for cooling the motor is accommodated in the upper water jacket and the lower water jacket, and the power assembly further includes water changing members arranged inside the upper water jacket and the lower water jacket, where the water changing members are used for adding or discharging the liquid in the upper water jacket and the lower water jacket. The structure may effectively improve thermal capacity of the structure, further may take away heat quickly by changing cold water, thereby improving reliability and durability of the system in a high-temperature and high-strength test.

Temperature sensors are arranged inside the upper water jacket and the lower water jacket respectively, so as to prevent water temperatures in the upper water jacket and the lower water jacket from being too high, and when the temperature is too high, an alarm may be given to remind to change water.

Figure 4:
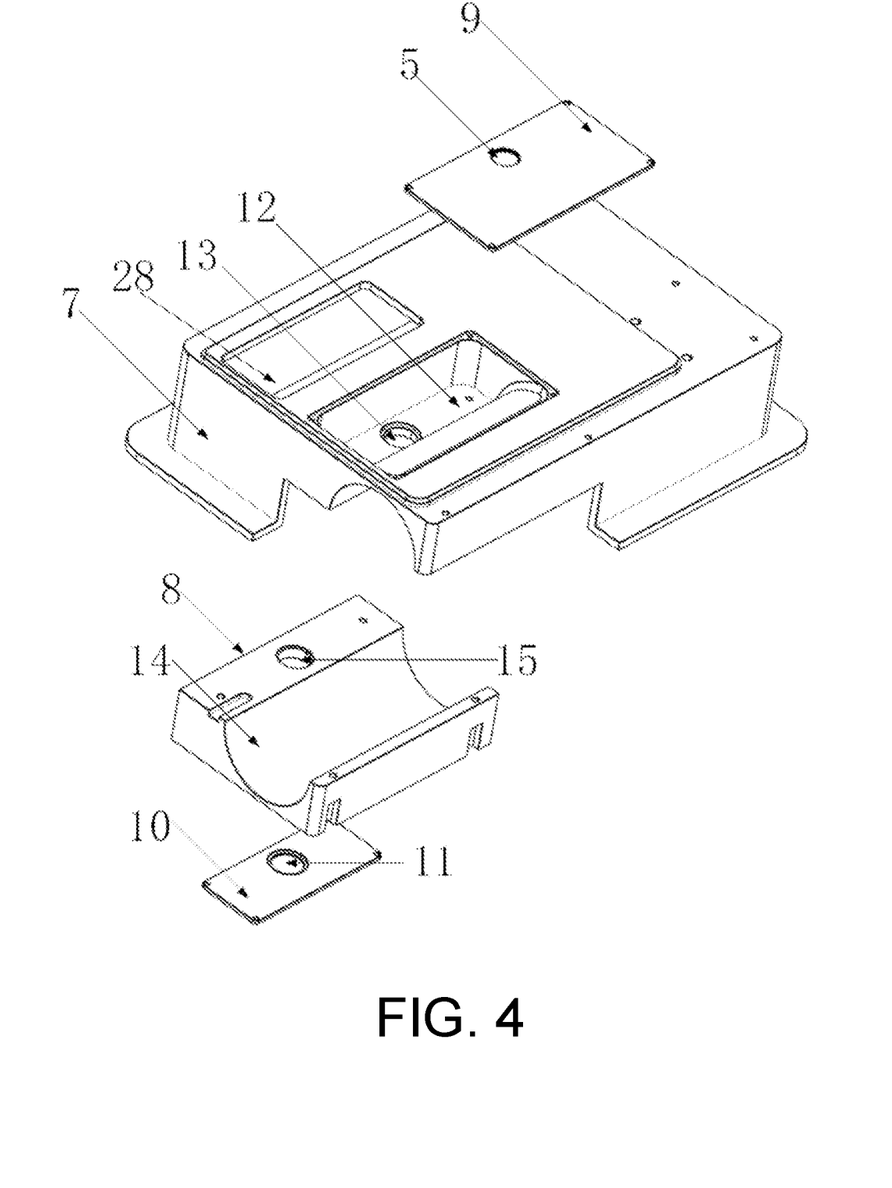
FIG. 4 is a schematic diagram of an exploded structure of the assembly housing of the present invention.
Figure 5:
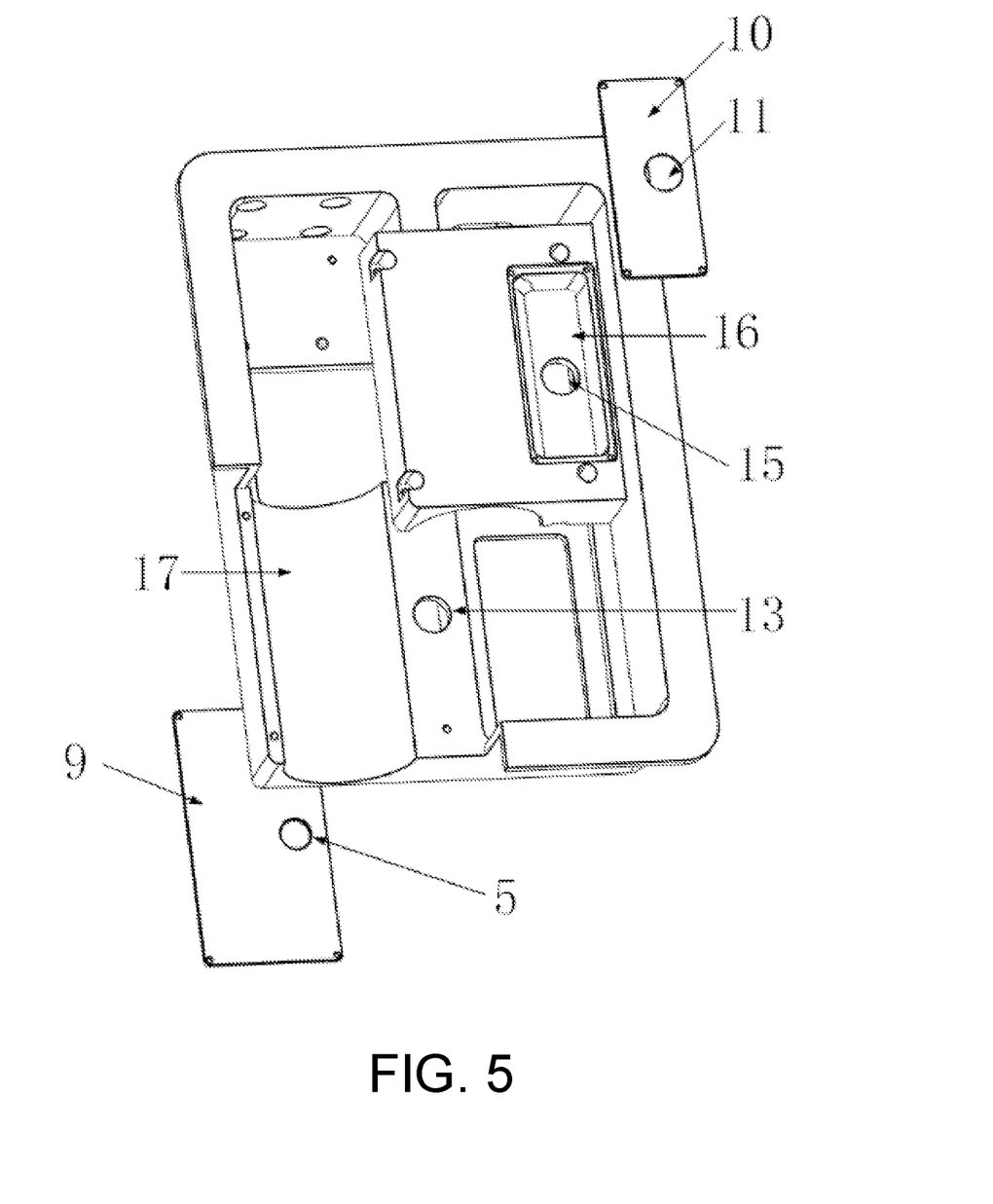
FIG. 5 is a schematic diagram of the exploded structure of the assembly housing of the present invention.
Figure 6:
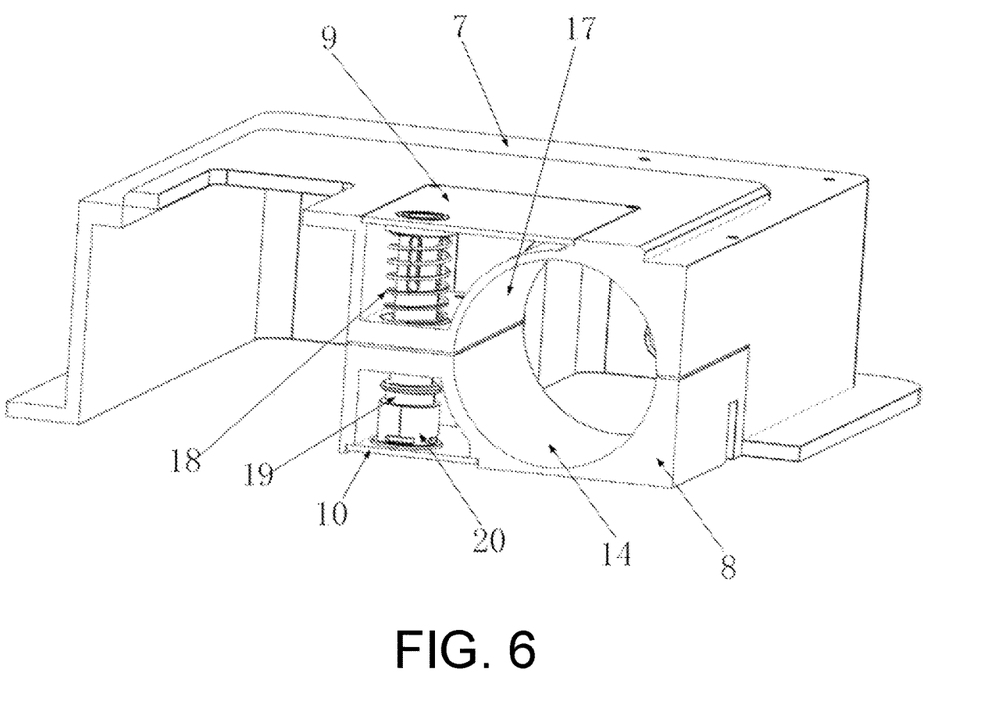
FIG. 6 is a schematic cross-sectional view of the assembly housing of the present invention.

Further, an upper water cavity 12 is provided at a top of the main housing 7, the upper water cavity 12 is provided close to the upper motor groove 17, an upper water jacket cover 9 is fixedly arranged at a top of the upper water cavity 12, the upper water jacket is formed between the upper water jacket cover 9 and the upper water cavity 12, a water injection hole 5 s provided on the upper water jacket cover 9, a first water passing hole 13 is provided at a bottom of the upper water cavity 12, a lower water cavity 16 is provided at a bottom of the motor bottom cover 8, the lower water cavity 16 is provided close to the lower motor groove 14, a lower water jacket cover 10 is fixedly arranged at a bottom of the lower water cavity 16, the lower water jacket is formed between the lower water jacket cover 10 and the lower water cavity 16, a second water passing hole 15 is provided at a top of the lower water cavity 16, a discharge hole 11 is provided at a bottom of the lower water jacket cover 10, and the upper water cavity 12 is in communication with the lower water cavity 16 by means of the first water passing hole 13 and the second water passing hole 15.

Figure 7:
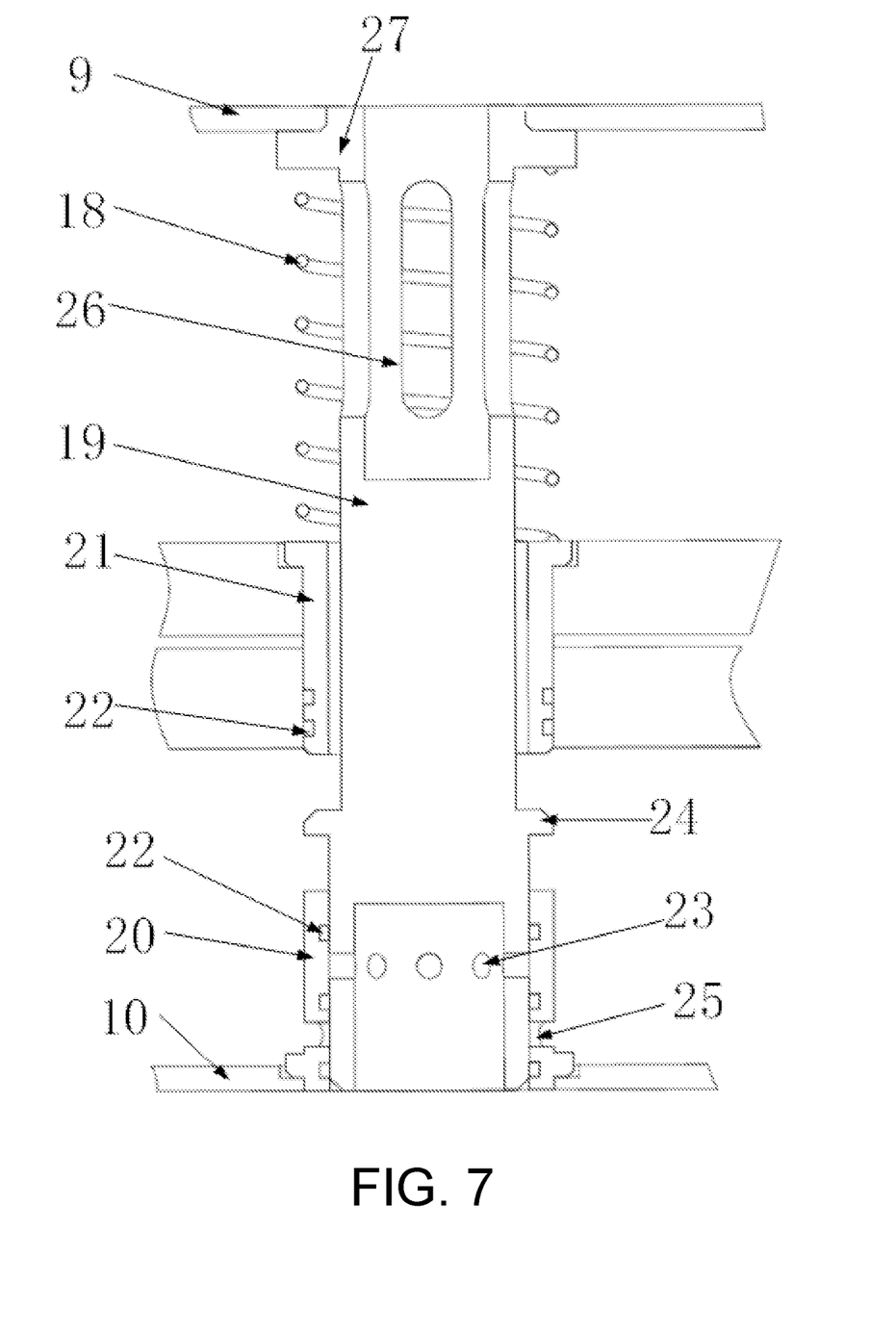
FIG. 7 is a structural schematic diagram of an upper water jacket, a lower water jacket and a water changing member of the present invention.
Figure 8:
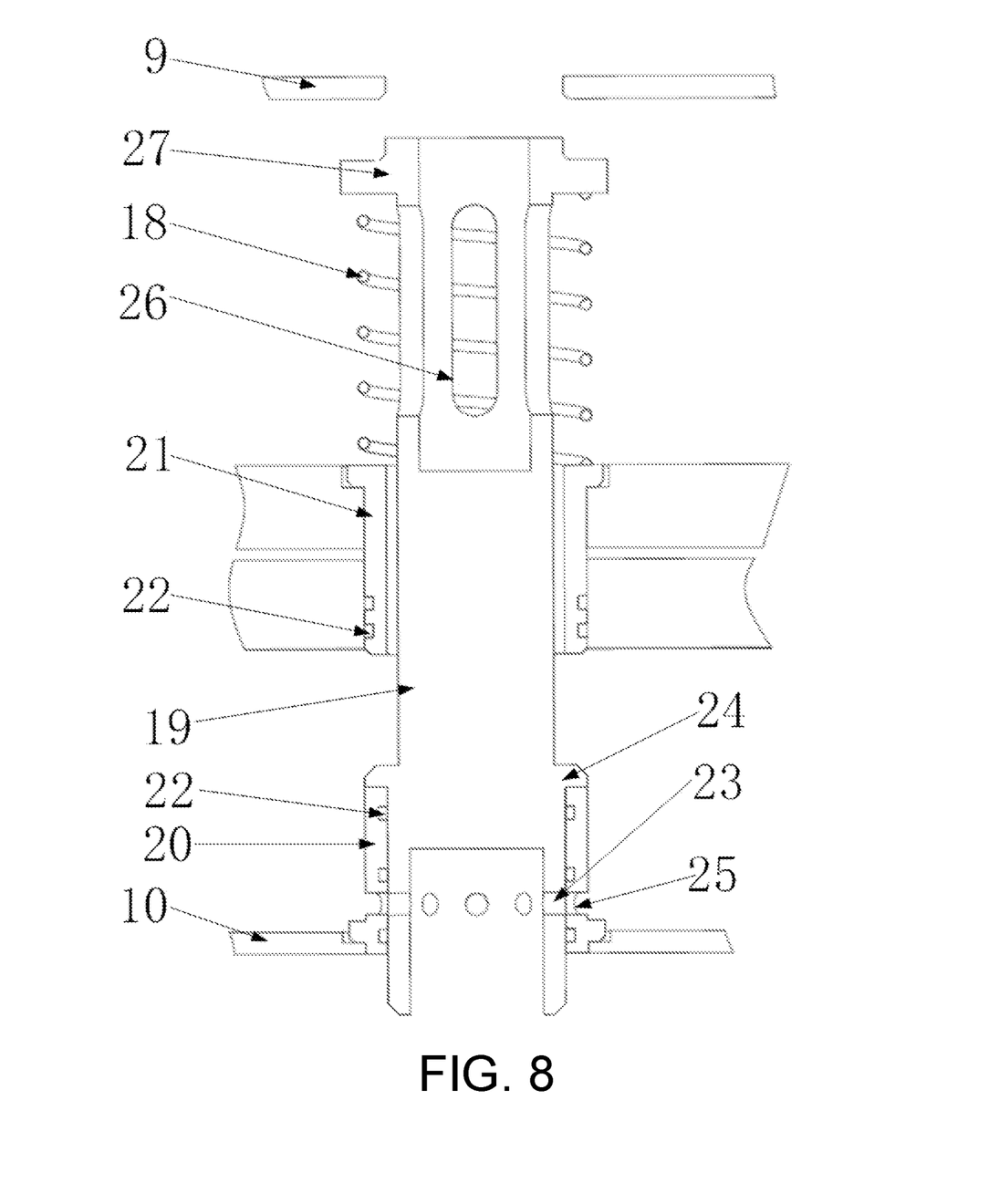
FIG. 8 is a structural schematic diagram of the upper water jacket, the lower water jacket and the water changing member during downward pressing of a discharge button of the present invention.
Figure 9:
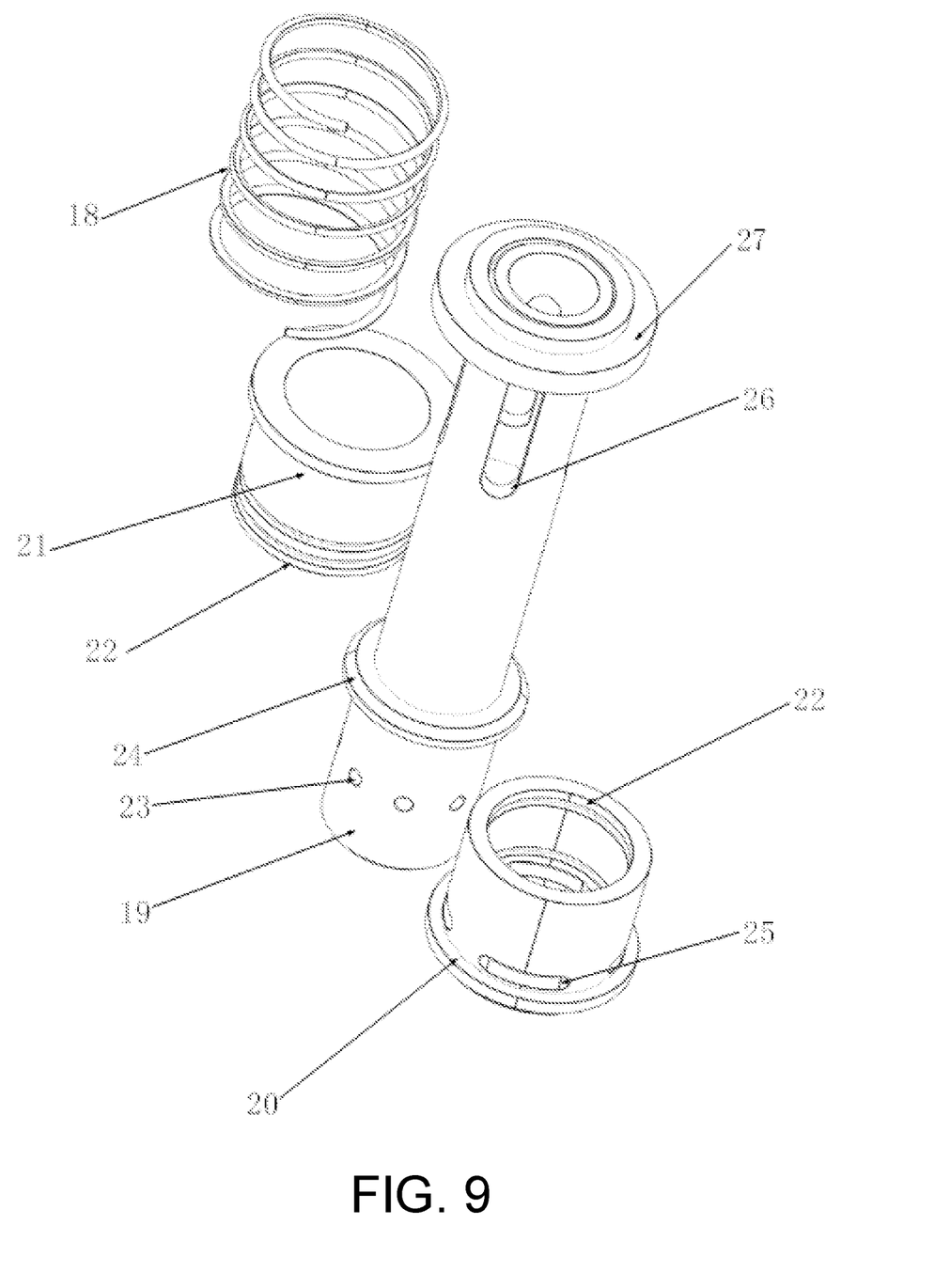
FIG. 9 is a schematic diagram of an exploded structure of the water changing member of the present invention.

Specifically, the water changing members each include a discharge button 19, a return spring 18, a communicating pipe 21 and a discharge seat 20, where the communicating pipe 21 is arranged in the first water passing hole 13 and the second water passing hole 15 in a penetrating manner, the discharge seat 20 is a hollow cylinder, the discharge seat 20 is fixedly arranged on the discharge hole 11, a discharge opening 25 is provided on a peripheral side of a bottom of the discharge seat 20, a top of the discharge button 19 is arranged at the water injection hole 5, a middle of the discharge button 19 is arranged inside the communicating pipe 21 in a penetrating manner, a peripheral side of the discharge button 19 and the communicating pipe 21 are arranged in a spaced manner to form a water discharging channel, a bottom of the discharge button 19 is arranged in the discharge seat 20 in a penetrating manner, the discharge button 19 is a cylinder, a hollow water inlet cavity is provided at an upper portion of the discharge button 19, a top of the hollow water inlet cavity is in communication with the outside by means of the water injection hole 5, a water inlet opening 26 is provided on a peripheral side of the hollow water inlet cavity, the hollow water inlet cavity is in communication with the upper water cavity 12 by means of the water inlet opening 26, a first limiting table 27 is arranged on a peripheral side of a top end of the discharge button 19, a top surface of the first limiting table 27 abuts against a bottom of the water inlet opening 26, a top end of the return spring 18 abuts against a bottom surface of the first limiting table 27, a bottom end of the return spring 18 abuts against a top of the communicating pipe 21, a hollow water outlet cavity is provided at a bottom of the discharge button 19, the hollow water outlet cavity is in communication with the outside by means of the discharge hole 11, a water outlet opening 23 is provided on a peripheral side of the hollow water outlet cavity, and a second limiting table 24 is arranged on a peripheral side of a lower portion of the discharge button 19.

Generally, the liquid in the upper water jacket and the lower water jacket is water.

when the water changing members are in use, and the liquid is added into the upper water jacket and the lower water jacket, the liquid enters the upper water jacket through the water injection hole 5, the hollow water inlet cavity and the water inlet opening 26 in sequence, the liquid in the upper water jacket enters the lower water jacket by means of the water discharging channel, and the water outlet opening 23 is away from the discharge opening 25; and when the temperature of the liquid in the upper water jacket and the lower water jacket is too high, and the liquid in the upper water jacket and the lower water jacket needs to be discharged, the discharge button 19 moves downwards until the second limiting table 24 abuts against a top of the discharge seat 20, the water outlet opening 23 is in communication with the discharge opening 25, the liquid in the upper water jacket enters the lower water jacket by means of the water discharging channel, and the liquid in the lower water jacket flows out of the lower water jacket through the discharge opening 25, the water outlet opening 23, the hollow water outlet cavity and the discharge hole 11 in sequence.

In order to improve sealing performance of the lower water jacket, two sealing rings 22 are arranged inside the discharge seat 20, the sealing rings 22 are arranged above the discharge opening 25 at an interval, and when the liquid is added into the upper water jacket and the lower water jacket, the water outlet opening 23 is located between the two sealing rings 22 above the discharge opening 25.

By quickly changing the cold water, it may be ensured that the motor 1 works at a low temperature range, thereby achieving reliability and durability of extreme working conditions of high temperature, large load, etc.

In another implementation of the present invention, in order to improve the sealing performance of the lower water jacket, three sealing rings 22 are arranged inside the discharge seat 20, where two sealing rings 22 are arranged above the discharge opening 25 at an interval, and when the liquid is added into the upper water jacket and the lower water jacket, the water outlet opening 23 is located between the two sealing rings 22 above the discharge opening 25, and the other sealing ring is located below the discharge opening 25.

In order to improve sealing performance of the upper water jacket, a plurality of sealing rings 22 are fixedly arranged on an outer side wall of the communicating pipe 21.

The power assembly further includes an assembly controller and a motor driver and a brake driver that are respectively connected to the assembly controller, where the motor driver is connected to the motor 1, and the brake driver is connected to the standby brake 3.

A control system of the power assembly is composed of the assembly controller, the motor driver and the brake driver, and with regard to an electromagnetic type standby brake solution and a hydraulic disc type standby brake solution, the brake driver is a current driving module and a hydraulic oil source and hydraulic control valve system separately.

The assembly controller receives a target speed instruction and state information of an upper controller, controls an actual speed to an error range allowed by a target speed in a closed-loop manner by using a feedforward compensation control strategy, and outputs target current of the motor 1; and the motor driver outputs driving current to the motor 1 according to requirements to drive robotic platform to operate. The motor driver simultaneously feeds states of the motor 1 and the motor driver back to the upper controller for monitoring.

When the assembly controller receives a fault message of the upper controller, in order to quickly brake the robotic platform, the standby brake 3 provides an additional braking force for the assembly under control of the brake driver in addition to braking torque by reverse drive of the motor 1. When the motor 1 or the motor driver breaks down, the upper controller detects a fault and issues the fault message, the assembly controller sends an emergency braking signal to the brake driver, only the standby brake 3 provides emergency braking torque to control the robotic platform to stop quickly and stably. This double redundant braking system greatly improves failure function safety of the robotic platform, and avoids apparatus or personnel damage caused by the system fault. The temperature sensors embedded in the upper water jacket and the lower water jacket may feed the temperature of the motor 1 back to the upper controller, when the temperature exceeds a set threshold, the upper controller gives an alarm, and in such a condition, the discharge button 19 should be pressed down to release the overheated liquid, and then cold water is injected by means of the water injection hole 5.

The above implementations are merely exemplary and are not meant to limit the scope of the present invention. These implementations further may be implemented in various other manners, and various omissions, substitutions and changes may be made without departing from the scope of the technical idea of the present invention.

What is claimed is:

1. A power assembly for a robotic platform for a GVT (Global Vehicle Target) of autonomous driving, comprising an assembly housing, a motor, a transmission mechanism, a standby brake, a suspension and a wheel, wherein an apparatus moving groove is provided at a bottom of the assembly housing, the transmission mechanism, the standby brake, the suspension and the wheel are arranged inside the apparatus moving groove, the motor is fixedly arranged inside the assembly housing, an output shaft of the motor is in transmission connection with an input end of the transmission mechanism, the standby brake is fixedly connected to the assembly housing, the standby brake is connected to the output shaft of the motor, a rotating shaft of the wheel is in transmission connection with an output end of the transmission mechanism, the suspension is fixedly arranged at the end of the transmission mechanism away from the motor, the suspension is fixedly arranged, and a top of the suspension abuts against a groove top of the apparatus moving groove; and when the power assembly is in use, a driving force output by the motor is transmitted to the wheel by means of the transmission mechanism, so as to drive the wheel to rotate, the standby brake is used for braking the output shaft of the motor, a top of the suspension supports the assembly housing, and when a load borne by the assembly housing changes, the suspension contracts or extends to drive the wheel to rotate upwards and downwards with a housing of the transmission mechanism as a swing arm and a rotating shaft of the motor as a swing arm rotation center, wherein a top of the assembly housing is provided with a wheel retraction window, and when the suspension contracts to drive the wheel to rotate upwards, top of the wheel pass through the wheel retraction window.

2. The power assembly for a robotic platform for a GVT of autonomous driving according to claim 1, wherein the assembly housing comprises a main housing and a motor bottom cover, wherein an upper motor groove is provided at a bottom of the main housing, a lower motor groove is provided on the motor bottom cover, the motor bottom cover covers the bottom of the main housing, and the upper motor groove matches the lower motor groove to form a motor cavity for fixedly arranging the motor.

3. The power assembly for a robotic platform for a GVT of autonomous driving according to claim 2, wherein an upper water jacket is arranged on the main housing and is arranged close to the upper motor groove, a lower water jacket is arranged on the motor bottom cover and is arranged close to the lower motor groove, a top of the upper water jacket is in communication with the outside, a bottom of the lower water jacket is in communication with a top of the lower water jacket, the bottom of the lower water jacket is in communication with the outside, a liquid for cooling the motor is accommodated in the upper water jacket and the lower water jacket, and the power assembly further comprises water changing members arranged inside the upper water jacket and the lower water jacket, wherein the water changing members are used for adding or discharging the liquid in the upper water jacket and the lower water jacket.

4. The power assembly for a robotic platform for a GVT of autonomous driving according to claim 3, wherein an upper water cavity is provided at a top of the main housing, the upper water cavity is provided close to the upper motor groove, an upper water jacket cover is fixedly arranged at a top of the upper water cavity, the upper water jacket is formed between the upper water jacket cover and the upper water cavity, a water injection hole is provided on the upper water jacket cover, a first water passing hole is provided at a bottom of the upper water cavity, a lower water cavity is provided at a bottom of the motor bottom cover, the lower water cavity is provided close to the lower motor groove, a lower water jacket cover is fixedly arranged at a bottom of the lower water cavity, the lower water jacket is formed between the lower water jacket cover and the lower water cavity, a second water passing hole is provided at a top of the lower water cavity, a discharge hole is provided at a bottom of the lower water jacket cover, and the upper water cavity is in communication with the lower water cavity by means of the first water passing hole and the second water passing hole.

5. The power assembly for a robotic platform for a GVT of autonomous driving according to claim 4, wherein the water changing members each comprise a discharge button, a return spring, a communicating pipe and a discharge seat, wherein the communicating pipe is arranged in the first water passing hole and the second water passing hole in a penetrating manner, the discharge seat is a hollow cylinder, the discharge seat is fixedly arranged on the discharge hole, a discharge opening is provided on a peripheral side of a bottom of the discharge seat, a top of the discharge button is arranged at the water injection hole, a middle of the discharge button is arranged inside the communicating pipe in a penetrating manner, a peripheral side of the discharge button and the communicating pipe are arranged in a spaced manner to form a water discharging channel, a bottom of the discharge button is arranged in the discharge seat in a penetrating manner, the discharge button is a cylinder, a hollow water inlet cavity is provided at an upper portion of the discharge button, a top of the hollow water inlet cavity is in communication with the outside by means of the water injection hole, a water inlet opening is provided on a peripheral side of the hollow water inlet cavity, the hollow water inlet cavity is in communication with the upper water cavity by means of the water inlet opening, a first limiting table is arranged on a peripheral side of a top end of the discharge button, a top surface of the first limiting table abuts against a bottom of the water inlet opening, a top end of the return spring abuts against a bottom surface of the first limiting table, a bottom end of the return spring abuts against a top of the communicating pipe, a hollow water outlet cavity is provided at a bottom of the discharge button, the hollow water outlet cavity is in communication with the outside by means of the discharge hole, a water outlet opening is provided on a peripheral side of the hollow water outlet cavity, and a second limiting table is arranged on a peripheral side of a lower portion of the discharge button;

when the liquid is added into the upper water jacket and the lower water jacket, the liquid enters the upper water jacket through the water injection hole, the hollow water inlet cavity and the water inlet opening in sequence, the liquid in the upper water jacket enters the lower water jacket by means of the water discharging channel, and the water outlet opening is away from the discharge opening; and when the liquid in the upper water jacket and the lower water jacket is discharged, the discharge button moves downwards until the second limiting table abuts against a top of the discharge seat, the water outlet opening is in communication with the discharge opening, the liquid in the upper water jacket enters the lower water jacket by means of the water discharging channel, and the liquid in the lower water jacket flows out of the lower water jacket through the discharge opening, the water outlet opening, the hollow water outlet cavity and the discharge hole in sequence.

6. The power assembly for a robotic platform for a GVT of autonomous driving according to claim 3, wherein temperature sensors are arranged inside the upper water jacket and the lower water jacket respectively.

7. The power assembly for a robotic platform for a GVT of autonomous driving according to the claim 5, wherein two sealing rings are arranged inside the discharge seat, the sealing rings are arranged above the discharge opening at an interval, and when the liquid is added into the upper water jacket and the lower water jacket, the water outlet opening is located between the two sealing rings above the discharge opening.

8. The power assembly for a robotic platform for a GVT of autonomous driving according to the claim 1, further comprising an assembly controller and a motor driver and a brake driver that are respectively connected to the assembly controller, wherein the motor driver is connected to the motor, and the brake driver is connected to the standby brake.

9. The power assembly for a robotic platform for a GVT of autonomous driving according to the claim 1, wherein the suspension is one of an air bag suspension and a spiral spring suspension.

* * * * *